United States Patent
Agarwal et al.

(10) Patent No.: US 12,278,861 B2
(45) Date of Patent: Apr. 15, 2025

(54) METHOD AND SYSTEM FOR ADDRESSING AND EXECUTING SERVERLESS FUNCTIONS

(71) Applicant: DigitalOcean, LLC, New York, NY (US)

(72) Inventors: Anshu Agarwal, San Jose, CA (US); Perry Cheng, Princeton, MA (US); Rodric Rabbah, Somers, NY (US); Eric Sven-Johan Swildens, Los Altos Hills, CA (US)

(73) Assignee: DigitalOcean, LLC, New York, NY (US)

( * ) Notice: Subject to any disclaimer, the term of this patent is extended or adjusted under 35 U.S.C. 154(b) by 0 days.

(21) Appl. No.: 16/726,187

(22) Filed: Dec. 23, 2019

(65) Prior Publication Data

US 2020/0204618 A1  Jun. 25, 2020

Related U.S. Application Data

(60) Provisional application No. 62/784,691, filed on Dec. 24, 2018.

(51) Int. Cl.
| | | |
|---|---|---|
| *H04L 67/1014* | (2022.01) | |
| *G06F 16/955* | (2019.01) | |
| *H04L 9/06* | (2006.01) | |
| *H04L 9/32* | (2006.01) | |
| *H04L 61/4511* | (2022.01) | |
| *H04L 67/1097* | (2022.01) | |

(52) U.S. Cl.
CPC ........ *H04L 67/1014* (2013.01); *G06F 16/955* (2019.01); *H04L 9/0643* (2013.01); *H04L 9/3247* (2013.01); *H04L 61/4511* (2022.05); *H04L 67/1097* (2013.01)

(58) Field of Classification Search
CPC . H04L 67/1014; H04L 9/0643; H04L 9/3247; H04L 61/1511; H04L 67/1097; G06F 16/955
See application file for complete search history.

(56) References Cited

U.S. PATENT DOCUMENTS

| | | | | |
|---|---|---|---|---|
| 6,052,730 A | * | 4/2000 | Felciano | G06F 11/3495 709/224 |
| 10,303,517 B1 | * | 5/2019 | Sloyan | G06F 11/3616 |
| 10,482,069 B1 | * | 11/2019 | Barnes | G06F 11/2046 |

(Continued)

OTHER PUBLICATIONS

F5, What is a Load Balancer? 2016 (Year: 2016).*

*Primary Examiner* — Oleg Survillo
*Assistant Examiner* — Abdelbasst Talioua
(74) *Attorney, Agent, or Firm* — Shield Intellectual Property PC; Kirk D. Wong

(57) ABSTRACT

A serverless function execution system enables fast, efficient and flexible deployment and execution of serverless functions. Functions in the system are stored as code at a location accessible by a Uniform Resource Locator (URL) or unique hostname. A combinatorial URL, the combination of the two locations, is utilized to combine specific code with a specific computation system to execute that code along with optional parameters. The system utilizes function isolation to prevent an executing function from being able to directly access or modify unauthorized data or processes external to the isolation unit.

19 Claims, 7 Drawing Sheets

(56) References Cited

U.S. PATENT DOCUMENTS

| | | | | |
|---|---|---|---|---|
| 10,887,427 | B1* | 1/2021 | Adnan | H04L 67/561 |
| 11,146,569 | B1* | 10/2021 | Brooker | G06F 21/335 |
| 11,366,652 | B1* | 6/2022 | Pressacco | G06F 9/5072 |
| 2003/0078961 | A1* | 4/2003 | Davis | H04L 61/301 |
| | | | | 709/229 |
| 2004/0199762 | A1* | 10/2004 | Carlson | H04L 63/062 |
| | | | | 713/153 |
| 2005/0193097 | A1* | 9/2005 | Guthrie | H04L 67/133 |
| | | | | 709/219 |
| 2005/0289350 | A1* | 12/2005 | Schmidt-Karaca | G06F 21/31 |
| | | | | 713/176 |
| 2010/0274786 | A1* | 10/2010 | Harris | G06F 16/24561 |
| | | | | 707/769 |
| 2017/0154017 | A1* | 6/2017 | Kristiansson | G06F 40/143 |
| 2018/0173502 | A1* | 6/2018 | Biskup | G06F 21/56 |
| 2018/0205549 | A1* | 7/2018 | Blinn | H04L 67/02 |
| 2018/0324204 | A1* | 11/2018 | McClory | G06F 9/5027 |
| 2018/0336356 | A1* | 11/2018 | Papaxenopoulos | G06F 8/65 |
| 2019/0028360 | A1* | 1/2019 | Douglas | H04L 41/22 |

\* cited by examiner

301 - https://js.n1m.com/raw.githubusercontent.com/corp/jtest/echo.js?msg=hello%20world

*executes a github javascript source function with parameters*

302 - https://js.n1m.com/fn.http/raw.githubusercontent.com/nimcorp-dev/demo/hello.js?token=BEoossVX...

*executes a private github repository javascript function*

303 - https://cust1.n1m.com/a.b.com/get_dow_price.js?pipetofunc1=cust1.n1m.com/a.b.com/to_csv.js

*pipelines the output of get_dow_price.js to to_csv.js*

304 - https://pl.n1m.com/%22s/cat/dog/r%22?input=cat

*executes "s/cat/dog/r" on the input "cat"*

305 - https://a.n1m.com/a.b.com/get_weather.js?hash=2BCF81C9103FCE

*executes a tamper-proof get_weather.js function*

306 - https://js.n1m.com/?jwt_token=eyJhbGciOiJIUzI1NiIsInR5cCI6IkpXVCJ9.eyJzb3VyY2UiO

*executes a javascript json web token encrypted source location*

307 - https://api.n1m.com/api.weather.com?token=xyz&zip=10589?pipetofunc1=int.col0

*executes a combination of a direct API call followed by an internal inline function*

308 - https://api.n1m.com/InR5cCI6IkpXVCJ9.eyJzb3VyY2...

*executes a hidden function*

309 - https://js.n1m.com/py.n1m.com/github.com/a/func.py

*executes a python function that returns javascript code that is then executed*

Figure 3

METHOD AND SYSTEM FOR ADDRESSING AND EXECUTING SERVERLESS FUNCTIONS

PRIORITY CLAIM

This application claims the benefit of U.S. Provisional Application No. 62/784,691, filed Dec. 24, 2018, the entire contents of which is hereby incorporated by reference for all purposes as if fully set forth herein, under 35 U.S.C. § 119(e).

TECHNOLOGY

The present invention relates generally to providing cloud services for use by client devices, and in particular, to executing function source code in a distributed system.

BACKGROUND

In the past, deploying computer software applications on the Internet required the purchase of a computing machine with an installed operating system and connecting the machine to the Internet. Server software was developed from source code and deployed on the Internet connected server. The process required purchasing and managing physical servers and ongoing operation management of those servers.

As the Internet evolved, service providers deployed large numbers of Internet connected computing machines and allowed developers to access and deploy server code to them. The service providers managed the ongoing operation and running of the computing machines and corporate operations teams or software developers managed installing and running their own server software on the machines.

Following a rise of service providers providing access to dedicated computing hardware, virtual machines became available, allowing a single physical computing machine to appear as multiple individual computing machines. Instead of selling access to physical computing machines, service providers began selling access to virtual machines. A virtual machine included an operating system and to a buyer of computing resource, appeared similar to a dedicated physical computing machine. Customers would purchase and manage virtual servers, installing and running server software on them and paying based on usage of time and resources.

Following virtual servers, container software systems were developed that isolated individual server applications from each other either within a single virtual machine or dedicated hardware computing machine. These containers did not contain a full operating system but contained the resources necessary to run a server and isolate one container and its associated resources from other containers on the system. Customers were required to manage their servers and containers.

Following service providers selling containers as a service, serverless function technology was developed. Instead of needing to manage containers and developing and managing the ongoing operation of servers or containers, customers of serverless computing services developed and deployed server code as functions. Customers no longer needed to monitor and manage resources such as containers, servers or machines, they were given the ability to develop code and deploy it without having to manage any infrastructure themselves.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates a variety of combinatorial paths, according to an embodiment of the invention;

DESCRIPTION OF EXAMPLE EMBODIMENTS

Figure 1:
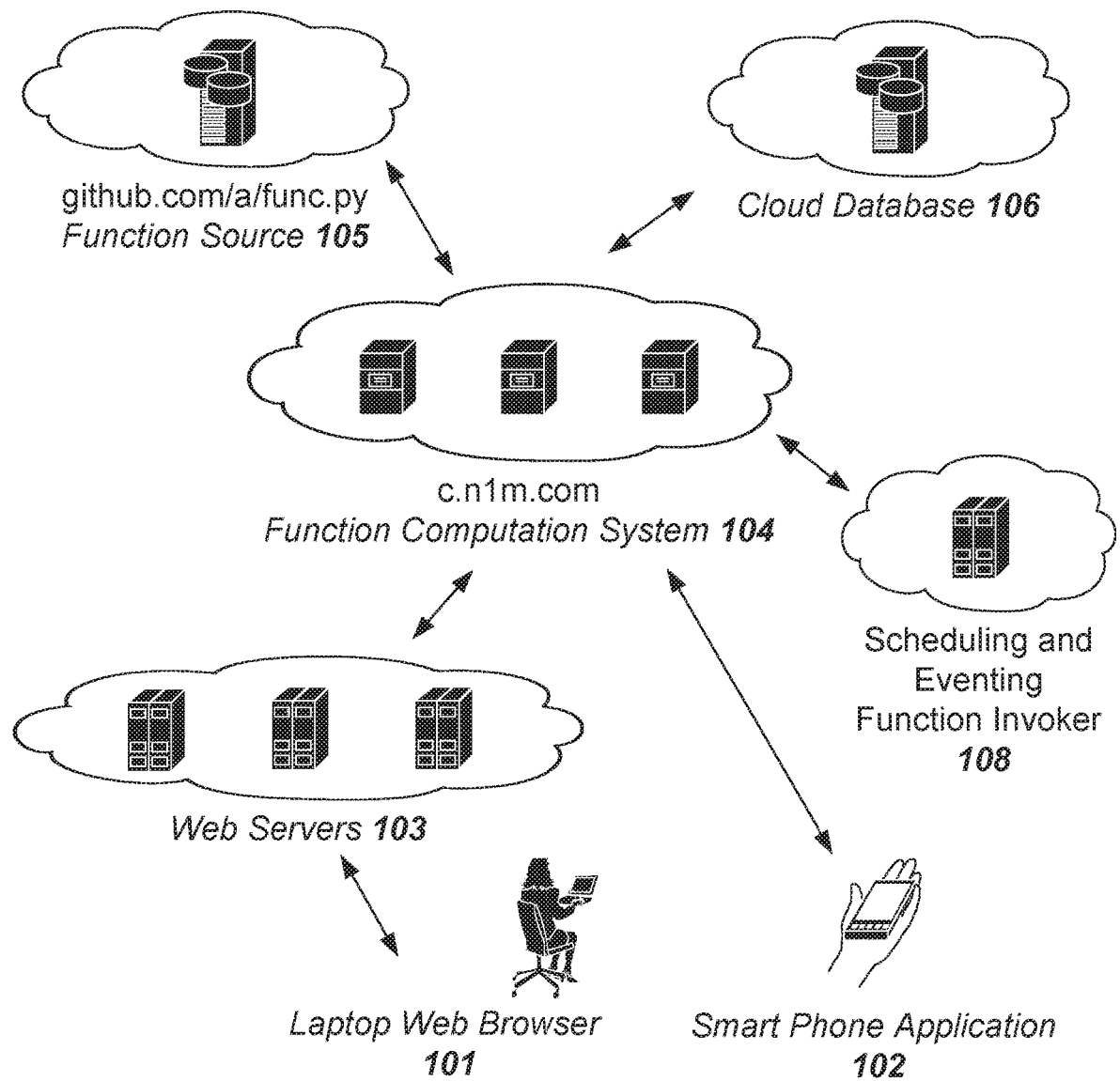
FIG. 1 illustrates a system with a representative combinatorial path, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
    2.0. Functional Overview
        2.1. Structural and Functional Description
    3.0. Implementation Mechanism—Hardware Overview
    4.0. Extensions and Alternatives 1.0. General Overview Examples of serverless services include Google Cloud Functions, IBM Cloud Functions (based on Apache OpenWhisk), Microsoft Azure Functions and Amazon's AWS Lambda functions.

Google Cloud Functions

With Google Cloud Functions, a developer can write function source code and use a gcloud command to deploy the source code into the Google Cloud Functions system:

gcloud functions deploy <function name>

After deployment, the function could be executed as a lightweight API by making a HTTPS request to the following:

<region>.cloudfunctions.net/<function name>

Google's Google Cloud Functions is a proprietary system consisting of proprietary software developed by Google.

IBM Cloud Functions

With IBM Cloud Functions, a developer can write function source code and use a web interface to create an action/API or use command line commands to do the same:

ibmcloud fn action create func func.js
    ibmcloud fn api create create /func . . .

The lightweight API could be executed with a HTTPS request to the following:

service.us.apiconnect.ibmcloud.com/gws/apigateway/api/<api id>

IBM Cloud Functions is a serverless function execution system based on Apache OpenWhisk. The OpenWhisk software was originally developed at IBM and later released as an Apache open source project under the name Apache OpenWhisk.

Microsoft Azure Functions

With Microsoft's Azure Functions, a developer can write function source code and use a web interface to create an action/API or use command line commands to do the same. To deploy functions, developers create a storage account in Azure Store where state is stored and also create a "functionapp" to host execution of functions.

func new—name MyFunc . . .
    az group create—name myStor . . .
    as functionapp create . . . —name myApp . . .
    az functionsapp config apsettings set . . .
    func azure functionapp publish myApp The resulting lightweight API could be executed with a HTTPS request to the following:

myApp.azurewebsites.net/api/MyFunc

Amazon AWS Lambda Functions

Using Amazon's AWS Lambda functions, a developer can write function source code and use a web interface to create an action/API from the source code or use commands, part of a command line interface (CLI) to do the same. To deploy function source code in the AWS system, the source code is bundled into a deployment package. Amazon AWS contains an API gateway that enables the creation of HTTPS endpoints that can be used to execute Lambda functions:

aws lambda create-function—function-name func . . .
    aws apigateway create-resource—rest-api-id . . .

The lightweight API created in the API gateway could be executed with a HTTPS request to the following:

<api>.execute-api.<region>.amazonaws.com/prod/<func>

Amazon's AWS Lambda Functions is a proprietary system consisting of proprietary software developed by Amazon.

Content Delivery Networks

A content delivery network is a network that delivers content from the Internet to requesting clients and that moves copies of the content or places the content close to requesting client to decrease latency required to fetch that content. Example resources that may be cached or stored in content delivery networks include HTML web pages, images, JavaScript CSS, video files and audio files.

In content delivery networks, dynamic content, generated by code running on a server, is generally handled as a pass-through, where requests are passed through the content delivery network system to the servers that generate the dynamic content.

Content can be delivered through a content delivery network in a number of ways:

A user of a content delivery network may make the content delivery network authoritative for the public facing hostname associated with the content to deliver and give the content delivery network an alternate source hostname to pull content from. The alternate hostname would not be visible to the public.

Similarly, a user of a content delivery network may set up a CNAME alias for a delivery hostname where the CNAME is a hostname that the content delivery network is authoritative for. The content delivery network receives requests for content and if the CNAME includes the source hostname, the content delivery network can automatically pull content from the source for delivery by pulling it from the source hostname.

Another way for a user to set up delivery through a content delivery network is by the use of a combinatorial URL where a source path is appended to a content delivery network hostname. For example, if a source item to deliver through the network has a path of:

x.a.com/file.html

Then a combinatorial URL to deliver the source through the content delivery network may be:

a.cdn.com/x.a.com/file.html

As serverless function use continues to grow, a system that would enable serverless functions to be easily deployed would be advantageous over existing deployment systems. A novel approach to serverless functions is to apply techniques that combine the ease of CDN deployment to serverless functions and that includes the creation of GraphQL or RESTful APIs along with direct source code execution, where code can be executed in a safe manner The system supports automatic scaling and has built-in protection from attacks such as denial of service attacks.

It would further be advantageous to provide a system that contained features such as anonymous inlined functions, chained functions, hidden functions, secret variables, prevention of use by bad actors, identity management, group-based scaling source and other advanced features.

2.0. Functional Overview

A serverless function execution system enabling the fast, efficient and flexible deployment and execution of serverless functions as GraphQL or RESTful APIs is disclosed. Functions in the system are stored as code at a location accessible by a Uniform Resource Locator (URL) or unique hostname. A computation system to perform function execution is similarly represented. A combinatorial URL, the combination of the two locations, is utilized to combine specific code with a specific computation system to execute that code along with optional parameters, to define a GraphQL or RESTful API.

The computation system utilizes function isolation to prevent an executing function from being able to directly access or modify unauthorized data or processes external to the isolation unit. A function isolation orchestrator, called an invoker, manages a set of function isolation units in which functions are executed, creating and destroying units as needed and managing function initialization and the environments required to execute functions.

A source code location URL specifies a network file location and, optionally, a protocol to access the function source code. A source code location URL may itself be a combinatorial URL, allowing the creation of anonymous functions. A combinatorial URL may also include optional parameters that specify other combinatorial URLs, allowing trivial chaining of serverless functions.

In an embodiment, a serverless function execution system is implemented that allows a software developer to develop code, store the code at a location accessible by the computation system and then create a GraphQL or RESTful API directly from the source code location by the creation of a combinatorial URL.

Functions are executed by the system in isolation units, such as containers, unikernels or micro VMs, on either a virtual or physical computing machine. Isolation containers are managed by isolation orchestrators called invokers. An isolation unit prevents an executing function from accessing the runtime or data of functions running in other unit on the computing system and prevents the function from directly accessing host operating system resources, data or running processes.

The usage of combinatorial paths to address computational resource and function source locations allows the execution of serverless functions without the need of a separate step of deploying function source code and/or resources into the system.

The computation engine automatically scales as more functions are executed. New isolation units (e.g., containers or micro VMs) are created when needed and new invokers are automatically created and deployed to additional computing resources as existing resources reach their usage limits. Functions in the system are grouped into sets, allowing optimizations when mapping functions to differing computing resources.

The system supports hidden functions where function source code may be hidden from the general public. Function source may be hidden by username and password, encrypted source locations or by only allowing the computation system to access the function source code.

The ability to use function mappings decouples a hidden function location from its publicly accessible resource location and can be used to encode secret keys and other values required to execute functions from the public API used to access them.

Combining functions using combinatorial function pipelines allows a developer to combine functions together in an uncomplicated way. The feature enables straightforward use of many general purpose functions such as ones that allow the tabulation, transformation, editing and formatting of function output.

Utilizing a combinatorial path with inline code allows the creation of anonymous functions. Anonymous functions are typically very small functions that call a single API or that perform a simple operation (e.g., schema alignment). Anonymous functions can be useful for creating function stubs during code development.

A set of functions and their associated APIs can be described as a function library. A function library is a document that contains the name and locations of a set of functions along with their associated API endpoints, descriptions and attributes.

Functions and function libraries can be bundled into function packages which may contain the source files for multiple functions. Function packages may be compressed and encrypted with public/private key encryption.

The system supports secret values which are stored key/value pairs grouped into named variable sets. A given variable set may be associated with a function location or partial function location. Variable sets may be encrypted.

The ability to create and use user private file systems, represented by a file system identifier, allows users calling a function to have the function execution chain (i.e., composition of functions) operate on data specified by the caller. A private file system can be made public by making the file system identifier public. Read-only versions of the private file system or a subset thereof can be created by creating a new read-only file system identifier from the private file system identifier.

Functions themselves may create and use function private file systems, also represented by file system identifiers. These file systems are associated with the path of the function executing and are not accessible from other functions. As with user private file systems, a function can create a read-only version of a function private file system, or subset thereof, that can be passed to other functions or to end users.

To validate access to resources, identity management may be built into the service. Access to system resources or to external resources can require usernames and passwords or other methods to verify identity before allowing access to those resources.

As functions call other functions, the system may maintain a virtual function stack, allowing developers to inspect the input and outputs of functions and pause and replay a running chain of functions. The ability to pause and replay the execution of a function chain is helpful when debugging function execution.

To allow the system to be run as a public service, it requires methods to prevent usage by bad actors. Without methods to prevent the actions of bad actors, an individual or group can write code to cause the system to attack itself, exhausting all its resources, or attack other network connected systems.

To increase performance, the system can utilize source caching where function source code is cached in the system for a period of time after being loaded from an external location. Methods to force the system to use uncached source code are available, as are methods to purge currently cached function code from the system. More generally, the system may utilize resource caching to include isolation units, and file system resources already allocated for a function.

The use of tamper-proof function trees allows a function caller to validate a function by inspecting its source and then later call the function while being able to ensure that the function called has not changed since the time when it was last validated. Tamper-proof function trees enable the creation of provably fair games and smart contracts, where code trees can be made invariable through the use of a Merkle tree source code structure.

Signed functions, which are function source code files or packages that are signed with public/private key encryption, enable a user or process calling a function the ability to ensure that the function being called was created by a specific individual or group.

To enable effortless debugging of functions and function chains, the system may incorporate the ability to access a debug combinatorial URL. A debug combinatorial URL is a combination of a debugging system location and a function's combinatorial URL. The debug URL allows a developer to debug the associated function or function's execution chain. If a function is a hidden function, the private location of the function is part of the debug combinatorial URL to debug the function.

To limit access to the system, the system may require function callers to have ownership of resource tokens that are spent as system resources are used. Resource tokens represent an amount of resources that can be used and may be given out or sold to allow access to the system.

The system allows the creation of a function API marketplace where function developers can be paid when function clients utilize their functions. Function developers and function clients are identified by their respective account in the system. When a function client utilizes a function developer's function, a payment is automatically credited from the client's account to the developer's account. Competing function developers can list their functions for sale in the marketplace and function clients can find and select functions based on features, price and performance II. Combinatorial Paths A combinatorial URL combines a location of an isolation container computing resource with the location of a function's source code to execute within that resource to define a GraphQL and/or RESTful API.

An isolated container location may be represented by a unique hostname such as:
js.n1m.com
or by a unique URL location path such as:
n1m.com/js.compute In the case the isolation container location is represented by a hostname, the hostname may be an DNS CNAME alias (or multiple CNAME alias) that ultimately resolves to a hostname representing an isolated container location.

A source code file location may similarly be represented with a unique hostname such as:
mysrccodefile.ns.com
or by a unique URL location path such as:
ns.com/src/hello.js The combination of the two locations creates a combinatorial URL that automatically defines a GraphQL and/or RESTful API. Unique hostnames may be combined:
js.n1m.com/mysrccodefile.ns.com
or unique URL location paths may be combined:
n1m.com/js.compute/ns.com/src/hello.js
or any combination of the two. In the former combinatorial example, js.n1m.com will resolve via DNS (Domain Name Service) to a set of IP addresses representing an isolated function resource (e.g., a container). The mysrccodefile.ns.com will resolve via DNS to one or more IP addresses that serves up a source code function file via the HTTP or HTTPS protocol. The source code returned by making an HTTP or HTTPS protocol GET request to the mysrccodefile.ns.com hostname will be loaded into an isolated function unit represented by the js.n1m.com hostname with the appropriate environment, and the code will be executed. Any code response will be returned to the client making the combinatorial URL request.

In the latter combinatorial example, n1m.com will resolve via DNS (Domain Name Service) to a set of IP addresses representing a set of computing resources. Of those resources, the js.compute isolated function resource will be chosen to execute the source code.

The ns.com source code hostname will resolve via DNS to a set of IP addresses representing servers that can serve up source code via the HTTP or HTTPS protocol. The source code ns.com/sourcecode/hello.js will be loaded into the n1m.com/js.compute isolation unit with the appropriate environment, and the code will be executed. When the combinatorial URL is accessed utilizing a HTTPS GET request via the URL:
https://n1m.com/js.compute/ns.com/src/hello.js
the result will be returned as an HTTPS response. If the function results in a JSON (JavaScript Object Notation) result or other result, that result will be returned to the client making the request. Isolated function resources locations and source code delivery locations are normally represented as hostnames but can also be represented as IP addresses (v4 or v6).

A combinatorial URL may be represented as combined DNS hostname or DNS CNAME along with a path. The DNS hostname may itself contain the combination of the isolation container computing resource and the resource location of the function source code. For example, a combinatorial URL such as:
ns.com.n1m.com/src/hello.js
could be equivalent to the combinatorial URL:
n1.com/ns.com/src/hello.js
if n1m.com is known in the former case to be a valid compute location. The prefix ns.com in the hostname of the former is the source location. Using hostname embedding of source locations allows a user of the system to have a branded hostname such as compute.ns.com that is a DNS CNAME alias to a compute system hostname such as ns.com.n1m.com. Forming a CNAME in this manner allows a customer to utilize a combinatorial URL such as:
compute.ns.com/src/hello.js When the DNS hostname compute.ns.com is resolved, it will resolve to a DNS CNAME alias of ns.com.n1m.com. This hostname, in turn, is resolved by an authoritative server in the computing system which splits the hostname into a source location hostname of ns.com and a compute hostname of n1m.com.

The usage of combinatorial paths in the various manners presented allows the execution of serverless functions without the need of a separate step of deploying function source code and/or resources into the system. The use of isolation units allows the function to execute in a safe and controlled manner III. Computation Engine The computation engine is responsible for executing functions in isolated units such as containers. A specific computation engine may be referenced by a hostname or hostname and path. In either case, the hostname associated with the computation engine is resolved by the DNS (Domain Name System).

The authoritative chain of DNS servers to that resolves the hostname to an IP address may be load balanced by the use of anycast with multiple authoritative DNS servers and/or by having multiple authoritative DNS servers represented by individual IP addresses and with a local load balancing system operating to distribute requests among local set of local DNS servers represented by an individual IP address.

The DNS resolution system may include a global load balancer that returns computation server IP addresses based on a combination of availability, load, resource usage, predicted resource usage and/or network latency associated with the computation servers or computation server clusters associated with each IP address.

The individual IP addresses returned by the DNS system may themselves represent clusters of computation engine servers. An individual IP address returned may be a virtual IP addresses where a single IP address is mapped to a number of individual computation engine servers. The computation engine servers themselves may be physical servers or virtual servers.

In the case a virtual IP address is returned, a local load balancer may accept traffic for the virtual IP address. The local load balancer may route request traffic to a computation engine server based on a combination of availability, load, resource usage, predicted resource usage and/or network latency.

On an individual computation engine server, requests may pass through an HTTP/HTTPS server that serves as an entry point to the system. A request may pass through the entry point or directly to an invoker.

An invoker on a computation engine server is responsible for creating, configuring and destroying isolation units. An isolation unit is a resource that isolates one running process from other processes and from unauthorized resources on the host system. Some example types of isolation containers are Docker, LXC (Linux Containers), Windows containers, unikernel based systems, micro VMs, and Hyper-V containers.

When a request for function execution is received, an invoker will create an isolation unit for the function to be executed in. The invoker may reuse a previously allocated unit instead of creating one, if such reuse will not compromise security. An invoker may also keep a set of "warm" isolation unit that are preloaded with a function or that are preloaded with the environment ready for a given type of function to prevent the delay caused by "cold" (initial) function activations.

Function execution requests to the computation engine can be made in the form of combinatorial URLs. In parallel with the setup and configuration of isolation units, the invoker will make a request for source code from the source path portion of the combinatorial URL. The source code may be programming language code or may be an executable (e.g., binary), or a container image. If the source code is programming language code or executable, the respective programming or binary compatible environment will be loaded into an isolation unit to allow the code to execute. If the source code is comprised of a container image, the image itself can be loaded to execute.

After setting up an isolation unit and obtaining the source or binary to execute, the invoker will cause the function to execute inside the isolation unit and then returns the result to the requester. When function execution is complete, an invoker may destroy the resources allocated for the function or, if it does not compromise security, keep them "warm" (available) for future reuse.

The system may determine statistically what functions will likely be called in the near future and set up "warm" isolation units with an environment ready to execute those functions. It may also pre-load functions into those isolation units that may be expected to execute in the near future.

If an invoker determines it will run out of server resources to create new isolation units, new computing resources are automatically allocated to add additional invokers and associated resources to be the computation engine system.

The computation engine may be run on hardware or virtual machines directly or it can be run using a container orchestration system such as Kubernetes, Mesos, or K-native (a container platform based on Kubernetes).

When the computing engine system is run on hardware or virtual machines, the invoker will cause more hardware or virtual servers to be added to the cluster automatically with additional entry points and invokers made available on the servers. In the case of hardware servers, idle servers will be added to the set of computation servers. In the case of virtual machines, new virtual machines can be created on-demand through scripted command line or API calls. In both cases, new servers can also be added to the set of possible computation servers predicatively.

When the computing engine system is run on a container orchestration system, scaling may be provided by the underling system or new resources can be pragmatically added by calling the appropriate scripted commands or API calls to the underlying system. The underlying system can be set to remove or delete resources when they are no longer used. As with the hardware and virtual servers, predictive resource allocation can be performed either by the underlying container orchestration system itself or by executing script commands or making API calls to allocate new resources as they are predicted to be needed.

Computing engine servers may be grouped by customer. A given customer may be assigned their own cluster of compute servers, separate from all other customers or customers can be grouped together by similar profile or those that require similar resources.

Servers may also be grouped by the function type they support. A given set of servers that have GPU (Graphics Processing Unit) or TPU (Tensor Processing Unit) resources available to them may be grouped separately from other servers, allowing machine learning workloads to work efficiently on the group of servers with resources specific to that task.

Grouping may be performed by having different hostnames for different computing engine server groups. For example, the hostname:

customerx.n1m.com
   may be associated with a specific customer "customerx" and:

js.n1m.com

May be associated with a set of servers that process JavaScript functions efficiently. Multiple shared groups may be numbered:

public01.n1m.com
public02.n1m.com
   to allow the two sets to scale independently and to prevent a denial of service or other attack directed at one group from affecting other groups if the servers in the groups are disjoint sets.

Output returned from a computation engine may optionally be cached, if appropriate, by a caching system that caches results for a period of time (TTL or time to live or TTL). Directives may be present in the output to prevent caching of certain outputs.

As the computation engine executes functions, it logs the performance and resources utilized by the executing functions. A function's external API calls may be required to exit the system through a proxy subsystem. If external API calls are made by a function and exit through the proxy, the proxy will log metrics related to the performance and availability of external API calls.

Examples of metrics recorded by the proxy subsystem include time to first response, overall response time, transmission bandwidth and similar. To enable more detailed metrics, statistics and logging related to the performance and resource utilization of API calls to external systems, external systems can return information about resources used as they respond to API calls as part of an API call response. These metrics can include cost, I/O delay and similar. This logging of performance, availability and cost information of API calls by the proxy subsystem allows a user to compare two competing API services against each other in terms of cost, performance and availability by running the same function using competing APIs and then comparing the various metrics of each against each other.

IV. Hidden Functions

Some embodiments of the serverless function system support hidden functions. When a computation engine is deployed to the public Internet and a combinatorial URL is used to execute a function, function source code is accessible over the Internet for the computation engine to load it. For security reasons, it can be advantageous to make function source code hidden from the general public, while still being available to the computation engine. Hidden functions are functions where the source code is hidden from the general public but where it can be accessed by the computation engine.

To make function source code hidden on the public Internet but still available to the computation engine, the function source location, and optionally the source code, can be encrypted with a secret key, maintained by the computation engine.

The computation engine can be called to compute a hidden encrypted URL from another URL. When the computation engine is called to execute a function that has its location defined by an encrypted URL, it will decrypt it and then access function source located at the decrypted URL location. If the source code itself must be decrypted, the computation engine will decode the function before it is executed.

The encryption method utilized can be symmetric encryption and the specific encryption method can be one of Blowfish, AES, DES, 3DES, RC5, RC6 or similar, related algorithms Many online systems that developers use to manage source code have the ability to restrict access to that source code to callers that provide a password, or username and password. Hidden functions can be useful when a function source location requires a password or username and password to access the source code as the username and password can be specified as part of a URL query string and a hidden function URL can include the encrypted query string. This hides the password or username and password from the public.

Some online systems to manage source code require an access token to access specific source code. In that case, the access token can be specified as part of a URL query string, and the URL encrypted into a hidden function as with usernames and/or passwords.

To give an example of a hidden function, consider a public function source URL that requires a username and password to access the source code:
    a.com/src/func.js?username=sonya&password=8641

A request can be made to a computation server to return the hidden function location for that public address. The computation engine can utilize a secret key with symmetric encryption to produce an encrypted URL such as:
    H4Ha08AHC7d61L981JcDD81dC
    where, when decrypted with the secret key maintained by the computation engine, produces the original URL. When the computation engine is given the encrypted URL to execute using a combinatorial URL, as in this example:
    js.n1m.com/H4Ha08AHC7d61L981JcDD81dC
it will decrypt the hidden function location and will load and execute the function associated with the decrypted function source URL.

Functions can be hidden by encrypting only a portion of the URL. For example, a function such as:
    a.com/10513/src/
      func.js?username=sonya&password=8641
    could be hidden as:
    a.com/H8ABC914CJ . . . B4/src/func.js
    where "H8ABC914CJ . . . B4" would decrypt and expand to 10513 and also "username=sonya" "&password=8641"

This would be enabled by including encoded positional references in the encrypted portion just prior to encryption and then using them when unhiding the URL. For example:
    a.com/10513/src/
      func.js?username=sonya&password=8641
    would first be converted to:
    [insert at position 7] 10513 [append] username=sonya [append]&password=8641
    just before encryption and those positional arguments would be used to create the unhidden URL just after decryption.

Access to hidden functions may also be restricted such that only the computation engine has access to the function source code. The server that serves up the source code can authenticate a requester using public key encryption to ensure the requester is authorized to view the source code. The computation engine would maintain a private key and public key that would be validated by the server serving up the source code.

To enhance security, the system can require that for hidden functions, if debugging and logging is available via combinatorial URLs, the unencrypted URL can be utilized to get logging or debugging information. This prevents the general public from getting logging or debugging information for a given function as the public does not have access to the unencrypted function source code URL.

V. Function Mappings

An embodiment may support function mappings where the computation engine system maintains a set of public function URL to private URL mappings. The private URLs may be combinatorial URLs or may be file locations that exist within the computation engine system itself.

To maintain a set of function mappings, the computation engine system may utilize a key/value database. Some representative key/value databases include Redis, DynamoDB, memcached or similar. When used with a key/value database, keys would include the public function URL and their associated values would include the private function source location.

Function mappings can allow short or easy to understand function names when an internal name is long or complex. As an example, a function mapping could be created where the public URL:
    a.n1m.com/buy_item
    maps to a private function URL such as:
    a.n1m.com/a.com/src/buyitem.js?password=4331

As with hidden functions, function mappings allows passwords and access tokens to be hidden from the public.

When a computation server receives a request for a function with a mapped public URL location, the computation engine looks up the mapped public URL location in the key/value data to find the private source function location. It then loads the private source from the private location and executes the function.

Function maps may be kept in sets, allowing the atomic swapping of two sets of function maps where both are associated with the same public functions. This can be useful to deploy new versions of a set of functions all at once. A mapping can be made for a test version of public to private functions and when testing it complete, it can be atomically swapped with a live version of the existing public functions. If problems are found with functions that are part of a function map set, they can be atomically reverted to a previous version by reverting to the previous function map settings in a single operation.

The computation engine may load a set of function mappings from a URL that points to a file containing a list of the mappings. This allows users of the system to update the function mappings external to the computation engine system. An API call would exist to have the computation engine load or reload the function mappings from the URL to update the mappings in the system. After loading the mappings, the computation engine could store each individual function mapping in the key/value database. To reload the set of function mappings, the computation engine would erase its existing set of mappings and load the new set from the URL containing the new mappings.

VI. Combinatorial Function Pipelines

Some embodiments allow combinatorial functions to be chained using combinatorial function pipelines where the output of one function is piped into the input of another function. A function pipeline can be created via a combined combinatorial function URL.

As an example, a function "get_weather.js" that returns JSON format output could have its output converted to XML using a "toxml.js" function via a combinatorial function pipeline such as:

cust1.n1m.com/a.b.com/
   get_weather.js?pipetofunc=cust1.n1m.com/a.b.c/toxml.js In the above example, the get_weather function is first executed by the computation engine. The get_weather function generates JSON output. The computation engine then pipes the JSON output of the get_weather function to input of the toxml function. The toxml function reads the JSON input and converts it to XML which is returned as the function result.

Additional functions can be chained to create longer function pipelines that can conveniently convert function output into formatted tables, sort output values, remove certain values and otherwise transform data from function output.

Pipelines can also be used to handily perform operations. A pipeline function could be created where the output of a get_weather function was piped into a function that formats the JSON weather response to be human readable. The readable output result could, in turn, be piped to a function that sends an SMS message of that output to a given cell phone number.

VII. Anonymous Functions

Some embodiments allow inline code in place of a function location in a combinatorial URL. This allows the creation of syntactically light anonymous functions where the function itself does not have a storage location.

A trivial example of an anonymous function is:
js.n1m.com/"_=>({msg: 'hello world'})"

The above example is shown without URL encoding. The quotes and other characters can be formatted into URL safe characters to be utilized in a URL.

In this example, the isolated function location is js.n1m.com. The computation engine will receive a request to include "_=>({msg: 'hello world'})" as the source code location. Identifying it as an inline function by virtue of the quotes, it will simply execute the code within quotes (which may be encoded). In this example, the function will return a JSON object containing the key {msg} and value {hello world}.

Anonymous functions can be useful for creating function stubs during code development. Specialized execution statements can be supported that output common formatted results such as JSON output format results. The function stubs themselves create API stubs that can be used to quickly mock up a GraphQL or REST API.

Anonymous functions can be combined with function pipelines where the output of one function or the output of a function pipeline can be pipelined to inline code.

VIII. Function Packages

Some embodiments may allow functions to be bundled into function packages to decrease the loading time of multiple functions. A function package may include a manifest (e.g., the function library) containing a listing of all the resources contained in the package as well as the resources themselves.

A function package may be compressed using any standard compression method such as gzip (DEFLATE), LZW compression or similar. Functions can be bundled as a webpack, which is a system that allows the bundling of multiple resources into one file.

Function packages can be encrypted with private key encryption algorithms such as Triple DES, Blowfish, etc. and the private key made available to the computation system so it can decrypt the package.

Function packages can contain also include other resources such as configuration operations related to the functions or files containing function mappings, routes or API endpoints related to the packaged functions.

IX. Function Libraries

In some embodiments, functions can be grouped together and defined as a function library. A function library is a set of functions and their associated API calls, descriptions and attributes.

A function library can be defined by a YAML file or other file format that supports schema type definitions. The file includes a section for each function along with the parameters to be set to call the function, the output types of the function, the specific API calls that the function supports, the set of hostnames or network locations where the function source is available and what access tokens are required to execute the function. Optionally, each function may specify network locations where the function may be executed.

A function's execution location may consist of a number of individual locations, allowing a client multiple options of locations to the execute the function. This enables the client to do load balancing for higher performance and availability. The function caller can keep track of the performance of executing the function on the various network locations listed and tend to use the one that has the highest performance. Additionally, if it finds an individual execution location is unresponsive, it can try an alternate.

The function library definition file can be located in a path at a standard location relative to a hostname to allow a quick determination of the functions available at a given source location. For example:

a.b.c/apis.yaml
   a root level file called apis.yaml can be a standard location for a file that contained the various function definitions with source located under the a.b.c hostname.

In some embodiments, the library definition file may be omitted if the functions are organized following a standard directory structure.

Each function may include a section that includes a reference to the location of the function source as well as locations to network locations where the function may be executed.

A function library definition file may contain possible function execution locations. A function's execution location may consist of a number of individual locations, allowing a client multiple options of locations to the execute the function. This enables the client to do load balancing for higher performance and availability. The function caller can keep track of the performance of executing the function on the various network locations listed and tend to use the one that has the highest performance. Additionally, if it finds an individual execution location is unresponsive, it can try an alternate.

X. Secret Values

In some embodiments, the system may natively support secret value sets. A secret value set is a named group of key/value data pairs. Secret value sets may be associated with the path of the executing function and/or a set name passed to an executing function.

Secret values may be loaded from external sources such as a key/value or SQL database or JSON file, they may be created by an executing function or they may be created by appropriate creation parameters passed along with a request to a computation engine URL.

The computation engine itself may manage sets of secret values by storing them in memory or they can be managed external to the computation engine and stored in a key value store or database such as Redis, DynamoDB, memcached or similar. When stored externally, secret value sets may be encrypted with a symmetric encryption method such as Blowfish, AES, DES, 3DES, RC5, RC6 or similar.

As an example, the following creation parameters passed with URL request to a cust1.n1m.com computation engine location will create a set of secret values named "v1" that are accessible by the computation engine:

cust1.n1m.com?varset=v1&pw=pass&
create=dblogin:mylogin,dbpassword:mypassword

The named set may later be passed as a variable to a combinatorial URL request, allowing the function to access the named variable set through the computation engine. Here the computation engine is referred as cust1.n1m.com:

cust1.n1m.com/a.b.com/transform.js?varset=v1

The specific secret values available in the set that this point are:

key=dblogin value=mylogin
key=dbpassword value=mypassword

If the function is called with a variable referencing a different secret value set, the code will execute using the values in that set:

cust1.n1m.com/transform.js?varset=v2

When the secret value set was created, a password (pw=pass) was specified along with the set name. The values can then be queried given the name of the set and password. In this example, a 'getvars' parameter in the URL will cause the complete set of secret values in the name set to be returned:

cust1.n1m.com?varset=v1&pw=pass&getvars

In some embodiments, alternative RESTful interfaces to the secret values store may be used.

XI. User Private File Systems

In some embodiments, the computation engine can allow users to create a private file system with the file system identified by a file system identifier. Folders and files kept in hierarchies in the file system may be added, read, moved (renamed), updated and deleted.

The file system identifier can be a unique identifier created by a user utilizing a hash function or random number or hash function, such as SHA512, on a random number. Alternatively, the computation engine may create a unique file system identifier for a user upon a user's request. The file system created by the user or the computation engine may have a password associated with it to restrict access to the file system to only those who have access to the password.

Internal to the computation engine, the file system can be represented as an on-disk file system, a distributed file system such as Lustre, Amazon S3 or similar or a map to a key/value store database where the keys contain the folder hierarchy and the values include file system contents.

A user private file system can be made public simply by making the file system identifier itself public if it is not password protected.

A user can create a read-only version of the file system by making a request to the computation engine for a read-only version of the file system along with the file system identifier.

To create a read-only version of the file system, the computation engine can use a secret, private key and symmetrically encrypt the file system identifier using a symmetric encryption method such as Triple DES, Blowfish or similar algorithm.

The following is an example of a URL to request to a computation engine {\tt a.n1m.com} to create a private file system and return its associated identifier:

a.n1m.com?create_filesystem=1

The computation engine could return a JSON response containing a file system id that may appear as:

file_system_id=F817GHB831 . . . 3B

This unique identifier that can be used in calls to functions that can operate on files and folders in that file system.

To create a read-only version of the file system, the following example URL could be requested:

a.n1m.com?create_ro_fs=F817GHB831 . . . 3B

The computation engine could return a JSON response containing a read-only file system id that may appear as:

file_system_id=ROFS_8AB819G8QC . . . 1C

This id is "ROFS_" appended to the secret key, symmetrically encrypted original file system identifier.

Functions in the system can then be passed the file system identifier and operate on the file system. This example function appends a single integer to a file "/nums" in the file system:

```
add_number_103_to_file(filesystem_id) {
    append_int_to_file(filesystem_id, "/nums", 103);
}
```

XII. Function Private File Systems

Some embodiments may allow functions to create and use function private file systems. Like user private file systems, a function private file system is a set of folders and files kept in hierarchies where the folders and files can be added, read, moved (renamed), updated and deleted.

A function private file system is identified by a file system identifier and associated with a function path or partial path. The file system itself is accessed through the computation engine.

A function private file system is only accessible by the function which has the matching associated function path or partial function path. The way to access the function private file system outside of the function with the associated path is for the function to pass the file system identifier for that file system outside of the functions execution space.

An example of a function creating and using a function private file system is:

```
global fid;
func( ) {
    lock(fid);
    if (!fid) {
        fid = create_filesystem( )
        fid.create_folder("/root");
    }
    unlock(fid);
}
```

In this case, the "global fid" is a variable that is global to all execution environments of the function. The lock( ) and unlock( ) is an atomic lock preventing other functions from executing while the file system is created.

Additionally, each function may have a default associated file system:

```
func( ) {
    var fid = get_function_private_filesystem( );
    fid.create_folder("/root");
}
```

As with user private file systems, a function private file system can be made read-only by creating a symmetrically encrypted read-only private file system identifier. This file system identifier can be passed to other functions to allow them read-only access to the function private file system.

Function private file systems enable a form of shared function memory with multiple executing functions being able to read, write update and delete from the same, shared data set. A function private filesystem may exist as a memory mapped structure or may be stored on one or more storage devices such as SSD (solid state drives). It may also be stored as some combination of both with recently accessed data being stored in memory and other data stored on one more storage devices.

XIII. Identity Management

In some embodiments, the computation system can include an identity management subsystem that allows an executing function to restrict access to system or external resources based on a caller's (or user's) authority.

The identity management subsystem can maintain a list of usernames, passwords and authorizations in a key/value database such as Redis, DynamoDB, memcached or similar or the system may integrate with an external system that supports an identity management protocol such as OpenID or OAuth (OAuth 2.0). In the latter case, the external system maintains the database of usernames, passwords and authorizations.

A user wanting to call a function with identity management security restrictions would first validate themselves with the authorization system. In the case OpenID or Oauth services were used, a user could log in with a username and password that exists on another service and authorization could be inherited or implied from that other service. Alternatively, a user could utilize a username and password specific to the computation engine service itself. The username itself could refer to a mobile phone number, email address or a unique name associated with the user.

Once validated with a username and password, the user receives a unique access token that is valid for some period of time. The access token may be in the form of a JSON Web Token. To utilize functions that require authorization, the token is passed to the function as an execution parameter. The access token itself can be stored by the computation engine in a key/value database where the key is the access token itself and the value includes the user's information and authorizations.

When using a web browser as a front end with a computation engine providing back-end functions for front end visualization, the access token can be kept in browser memory as a web site cookie and passed to back-end functions as needed. On mobile devices running Android, the access tokens can be stored as shared preferences. On mobile devices running iOS, access tokens can be stored in the iCloud Keychain. In all cases, the token can be stored encrypted, utilizing a symmetric encryption method, and decrypted when required. The access token may expire after a period of time, requiring the user to re-validate.

The following query shows a request to a computation engine to return a token:

a.n1m.com?get_token&username=u1&password=p1

The following shows a first portion of an encoded JSON Web token that could be returned by the call above.

HC7179BCA . . . 0F

The token return can then be used in calls to functions that require authorization. The computation engine has the authorizations and user information cached from the issuance of the token:

a.n1m.com/a.b.com/func.js?token=HC7179BCA . . . 0F

XIV. Virtual Function Stack

In some embodiments, as functions call other functions, the system can maintain a virtual function stack. The virtual function stack contains the address of functions called as well as any associated function parameters passed to those functions. The function stack also includes return values from functions.

The virtual function stack history is recorded allowing a function chain to be replayed for debugging and to allow inspection of variables in a chain of function calls. The virtual function stack may be stored in a list data structure with a record of all push/pop operations on the stack. The data structure may be indexed with a hash table where they key is function location.

When a function is called, the location of the function, along with its calling parameters are recorded to a virtual function stack log. When that function calls a second function, the second function location and calling parameters are recorded in the stack log. If the second function calls a third function, the call to the third function is similarly recorded. When the third function returns, any return value and status is recorded to the log. When the second function returns, the same information is recorded. And when the called function itself returns, the same information is recorded.

The recording of the virtual function stack allows introspection into all parameters, return values and status of all functions in the chain. Breakpoints at a given call chain point can be set and the virtual function stack inspected at that point to see the chain of functions called that led to the break point.

The virtual function stack may be maintained in memory, in a linked list data structure indexed by a hash table or it may be stored in a database accessible to the computation engine. The external database may be an SQL or key/value database. In the case of an SQL database, the log could be maintained in a single table with indexes of time, function location and caller and columns containing function parameters, return values and return status.

XV. Bad Actor Prevention

In embodiments where the system is available to the public as a publicly accessible service, it can include various methods to prevent usage by bad actors. Methods to prevent usage by bad actors are implemented at a number of different layers in the system. Without methods to prevent the actions of bad actors, an individual or group can attack the system by causing it to flood or exhaust network, compute or storage resources or the system could be used to attack other network connected systems.

The DNS layer, which resolves hostnames to IP addresses, is protected from DoS (Denial of Service) attack. To prevent a DoS attack against the DNS layer, large clusters of multiple DNS servers can be deployed where each cluster is represented by a single virtual IP address. DNS allows multiple DNS server IP addresses to be authoritative to resolve individual hostnames. A set of virtual IP address DNS server clusters, in multiple geographic regions, can be assigned as authoritative servers to resolve an individual hostnames to prevent a DoS attack against the DNS resolution layer.

Alternatively, an individual virtual IP addresses of DNS clusters may be set up as anycast addresses where each anycast address represents a number of geographically diverse DNS server clusters. Each cluster would contain multiple locally load-balanced servers represented by a virtual IP anycast address. A set of anycast virtual IP address DNS servern clusters can be assigned as authoritative servers to resolve an individual hostnames to prevent a DoS attack against the DNS resolution layer.

Utilizing the above methods and with a large enough set of resolving DNS servers in a number of different geographic regions, the system can avoid a DoS attack against the DNS layer by a bad actor.

The HTTP/S layer in the system may be protected by a similar mechanism. Anycast IP addresses may be utilized along with local load balancing to distribute requests across a large number of HTTP/S servers in differing geographic regions behind an individual anycast IP address. Multiple IP addresses can be utilized that point to different sets of geographically diverse clusters of machines.

Alternatively, each cluster of servers could be represented by a single IP and local virtual server based load balancing could be utilized along with DNS based load balancing. This obviates the need for anycast load balancing and use of anycast IP addresses which can make it easier to balance load across different regions.

To mitigate DoS attacks against the HTTP/S layer, a public system can utilize a number of existing service vendors of content delivery networks. These networks provide a HTTP/S caching layer that can accept a request first, passing it through to a computation engine if it is deemed not to be part of a DoS attack. The CDN (content delivery network) can filter requests that are deemed to be part of a DoS attack before they reach the computation engine.

A bad attacker can attempt to perform a DoS on the system by attempting to overload the computation system. The attacker could choose to attempt to run the computation system out of computation, memory or storage resources. To prevent a DoS attack against the computation engine layer, resource utilization can be limited by function caller, function or by a function creator identifier.

Alternatively, a token representing a given resource usage amount could be associated with functions and depleted as resources were used. Users of the system would only be able to create functions that spent the resources associated with the resource tokens they were given.

Another layer that a bad actor may attempt to exploit is nefarious access to external resources. A bad actor could attempt to utilize the service to overuse the resources of an external system. To prevent this, all calls to external systems would be required to go through a rate limiting system. If external resource usage stays below certain rate limits would they be allowed. An example would be limiting HTTP GET requests to a maximum of 10 accesses a second to a given hostname.

XVI. Source Caching

Some embodiments can utilize a caching system to cache externally hosted functions locally, as they are requested, to increase the performance of loading function source code. When source code from a given location needs to be requested by the computation engine, it will first consult the local source cache to see if that function code currently exists in the source code cache. If the source code does not exist in the cache, the computation engine will make an external request to retrieve the source, given the source location. When the source is retrieved, the source can be placed in the source cache.

The source cache may be implemented as a key/value store where the key is the source code location and where the value includes the function source code itself.

If a combinatorial URL is used to execute a function, a parameter may be passed in the request to cause the system to avoid checking the cache and force it to retrieve the most current version of the source from an external location. Additionally, an API call may be created that allows function source code to be purged from all function source caches by specific function path location or by partial function path location (parent directory in a hierarchy, for example).

The source code cache may also be implemented by forcing requests for external source code to go through a caching proxy such as Nginx, Varnish or Apache Traffic Server.

XVII. Tamper-Proof Function Trees

Some embodiments may support tamper-proof functions where the computation engine verifies hashes to ensure source code has not been tampered with since it was inspected.

When calling a function, a hash of the function source code can be passed as a parameter for the computation engine to verify that the hash of the source code matches what is expected. When loading a function's source code, the computation engine computes a hash based on the function's source. The method to compute the hash may be one of SHA256, SHA512, SHAKE128 or similar. If the function is cached by the computation engine, the hash computed may be cached so it does not need to be fully computed in the future for the same source.

When using combinatorial URLs, the hash parameter can be passed as a part of the request to execute the function. In this example:

a.n1m.com/a.b.com/func.js?hash=2BCF81C . . .

the computation engine will load the func.js source code from the a.b.com/func.js location and will verify that the hash of the source code matches 2BCF81C . . . (the hash shortened here for brevity) before executing the function. If the hash does not match, the computation will return an error and not execute the function.

A function that, in turn, calls other functions may also call them specifying a hash to verify before execution as well. If all functions in the function execution calling chain call other functions with hashes to verify the source has not been tampered with since inspection or verification, the entire function chain becomes a tamper-proof Merkle tree of function source code. This ensures that the code that executes in the computation engine is the exact code expected and that it has not been tampered with since the calling hash was computed from the inspected code.

Public source code can be inspected and a hash created of the function source code. If the function and all the functions it calls have computed hashes, a caller can be certain the source code in the chain does not contain any exploits or unexpected behavior.

Public source code that is made tamper-proof in this fashion allows the creation of provably fair games and systems and also allows the creation of smart contracts that will not execute unless they match what was expected by the function caller.

XVIII. Signed Functions

In some embodiments, when calling a function, the system can have a mechanism to ensure the function source code defining the executing function is authored by a given known source. To enable this, source code functions can be signed with the private key of a public (asymmetric) encryption key pair associated with an identity and the computation system can verify the signature and identity using the public key of the public encryption key pair.

To establish authorship, a known source has an identity registered. Identities can be created, registered and managed using the computation engine or the system can perform author verification by using an external system that
manages a public (asymmetric) key identity system.

In the case that identities are managed by the computation system, a request can be made to the computation system to generate a public key pair with an associated identity name. The identity name may be generated by the computation system or may be part of the request for the key pair. If an identity name is part of the request, the computation system will ensure the name does not already exist. The computation engine should not store or otherwise keep a copy of the private key in the public key pair.

After receiving a public key pair, a user of the system can generate a digital signature to digitally sign the source code utilizing the private key contained in the key pair. The signature may be added to the source code as a header or a footer as a comment section:

signature H1BC194174BE8FAB81 . . . 0D

When the computation engine is called to execute the function, a parameter may be added to the request giving an identity name to authenticate as author of the source code:

a.n1m.com/a.b.com/func.js?verify_id='authorx'

When the function is loaded by the computation engine, the engine will read the signature out of the header or footer of the function source, strip it from the function source and validate that the signature and associated identity match the identity parameter that is part of the request before executing the function. To validate the signature, the computation engine uses the public key of the public/private key pair associated with the given identity name. If the signature does not match, the function will not execute and instead will return with an error.

Examples of public key encryption methods the computation engine can use to generate keys and validate signatures include RSA encryption, elliptic curve encryption, Paillier cryptosystem encryption and similar.

In cases where public key identities are managed by an external system, the computation engine can inter-operate with the external system to verify function code signatures.

One example of an external identity system that can be utilized to verify the source of a function's source code is the existing identity management for encrypted HTTPS Internet communication. This method utilizes the existing public certificate authority hierarchy that is present to handle HTTPS certificates in web browsers and computers. Web browsers and computers contain a set of trusted root authorities along with a hierarchy of certificate authorities secured by those roots. A chain of certificates can be validated up to a root certificate to ensure a certificate is valid.

A set of Certificate Authorities exist to give out SSL/TLS certificates with their associated public/private keys that can be validated using the public certificate chain. The system can use this existing public infrastructure and allow users to utilize TLS/SSL certificates obtained from a Certificate authority to sign function source code. Typically these certificates are associated with domain names Self-signed certificates would not be permitted.

The signature may be added to the source code as a header or a footer as a comment section, as above, and the computation engine will validate the signature before executing a signed function, as above.

If the identity to verify is the same as the domain hosting the source code, then a function can simply contain a parameter to ensure the computation engine validates that the delivering hostname matches the signature for the function source code before executing it:

a.n1m.com/a.b.com/func.js?verify_domain

If the signature for the source code is different from the signature for the delivering domain, the signature identity can be passed as a parameter to be verified:

a.n1m.com/a.b.com/func.js?verify_id=a.x.com

As above, if the signature does not match, the computation engine will not execute the function and instead will return with an error.

Function packages, functions bundled into a single resource, can be signed and verified in the same manner function source code can be signed and verified.

XIX. Debug Combinatorial URL

In some embodiments, the system may include support for debug combinatorial URLs to allow a developer to quickly debug a function or function chain. A debug combinatorial URL is a combination of a debugging system location and a function's combinatorial URL. An an example, given the combinatorial URL:

a.n1m.com/a.b.com/func.js

With a debug service available on debug.n1m.com, the associated debug URL would be:

debug.n1m.com/a.n1m.com/a.b.com/func.js

If a function is a hidden function, the private location of the function can be part of the debug combinatorial URL to debug the function. If a function is a mapped function, the mapped destination can be part of the debug combinatorial URL to debug the function.

Accessing the debug URL associated with a function in a web browser will cause a web page to be returned that gives a developer the ability to inspect the function, set breakpoints, display tracing information and modify parameters of the function chain being debugged.

The debug hostname resolves to the computation engine. When the computation engine receives a request, it checks the hostname associated with the request and if the request is a debug hostname, it calls the debug subsystem that is part of the computation engine to generate an interactive debug JavaScript/HTML page as a response to the request.

A separate debug hostname may be provided that allows a requester to interact with the debug subsystem using API calls.

The debug subsystem allows a developer to inspect parameters passed to functions, inspect the stack as multiple functions are called, modify function parameter values, set breakpoints, replay function call chains until breakpoints and view function output.

Some embodiments may include a simplified debug combinatorial URL that allows a developer to enter function parameters, call a function and view its output in a web browser or mobile application. This simplified debug combinatorial URL can be utilized to test, view and perform minimal debugging of APIs that do not execute within the inventive system's computation engine (third party APIs).

XX. Resource Tokens

In some embodiments, to mitigate denial of service attacks due to resource exhaustion and to restrict resource usage to validated users, the system may require function callers to have ownership of resource tokens when calling functions. Resource tokens are keys that represent an amount of resources that can be used by the computation engine or by external resources utilized when executing functions.

An individual resource token may represent a number of different resource quantities. For example, a resource token may represent a given amount of computational resources over a period of time, a given amount of memory that can be utilized over a period of time and a given amount of network bandwidth that can be utilized over a period of time.

The resource token is passed as parameter to the computation engine along with the function to execute. As the function utilizes system resources, the corresponding resources are depleted from the corresponding values in the resource token. If the executing function calls another function that will be executed by the computation engine, the computation engine may pass the resource token along to the other function automatically. When the resources associated with a resource token are exhausted and still more resources are required, the computation engine may stop function execution and return an error to the caller.

Resource tokens may be created, updated and deleted by the computation engine itself. To manage the set of resource tokens, the computation engine may utilize a key/value database such as Redis, DynamoDB, memcached or similar. The stored key would include the resource token identifier and the value would include the resource quantities associated with the token identifier. The computation engine restricts the creation and management of resource tokens to verified token administration-level access requesters. Usage associated with a given resource token can be logged, allowing a user to see their usage of various resources over time.

Users of the system may be required to purchase tokens or may be given tokens to use the system during a trial period. If tokens are purchased, usage tokens can have a soft limit, where, as a resource token is depleted, as it gets near empty for a given resource, the owner can be contacted to refill the token by purchasing additional resources. For users with verified identities, resource tokens may be merged with identity tokens.

XXI. Function API Marketplace

Some embodiments can include an API marketplace where function developers can be paid when function clients utilize their functions.

To enable an API marketplace, the system allows clients and developers to sign up for system accounts. Developer system accounts are associated with monetary balances and client accounts are associated with monetary charges. Each system account includes one or more unique identifiers associated with the account.

A developer can associate their unique account identifier with a function they create or assume authority for. A client can utilize a function with a client identifier associated with their account and automatically be charged a fee for utilizing the function.

When the function is executed, the cost of the function is computed by the computation system in terms of CPU used, memory used or other resources usage such as storage or GPU/TPU usage and a charge is made to the client debit account and credited to the customer account.

The client and developer account balances and identifiers can be stored in a key/value database or an SQL database. Competing function developers can list their functions for sale in the marketplace and function clients can find and select functions based on features, price and performance An embodiment is a serverless function computation system comprised of a set of function computation servers in a computer network. A system according to the invention responds to requests to execute functions and invokes functions itself based on events or timers.

Function computation servers may be physically represented as dedicated computer hardware devices with a CPU, memory and, optionally, storage, or may be represented as a virtual server or as a server process operating in an isolation unit such. A virtual server is one where a single hardware computer device appears as many, independent servers. An isolation unit is an execution environment that isolates a running process and resources from other running processes and resources running on a hardware device, in a virtual machine or in another isolation unit. Docker, LXD and Windows Containers are three examples of technology enabling isolation units. Isolation units may also be implemented utilizing unikernels and micro VMs.

FIG. 1 shows one possible embodiment of a representative function computation server system present in a computer network. In the figure the computation server system 104 is present in a cloud environment in the Internet. Some representative cloud environments are Amazon AWS, Google Cloud or Microsoft Azure. In this embodiment, the set of servers comprising the system is run on virtual servers, hosted by a physical server in the respective cloud environment.

In this embodiment, a computation system can be used to present information in graphical form in a web page. To enable this, a user 101 using a laptop computer device may connect to a web server 103 to be delivered a web page that contains a graphical, visual representation of data returned by function computation system 104. To present a visual representation of data, a web server 103 can deliver a HTML page to user's laptop 101 with a graph component contained inside. The graph component itself could be in a binary image format such as PNG or JPG or the graph could be presented as interactive element such as a HTML Canvas drawing. To obtain the graph component to deliver, a web server 103 could make a function call to function computation system 104 to request a set of computed data, draw the graphical representation itself using computer code along with the computed data returned and return that image to device 101.

When the function computation system 104 is asked to execute a function, it contacts function source 105 to obtain the source code for the given function. An isolation unit is created and configured, the function is compiled if necessary and then executed by a function computation system 104. The function itself may require external data to perform its computation. In this case, the function requires data from a cloud database 106 to compute the data requested. The function code executing in the isolation unit, such as a container, in the function computation system 104 makes a request to cloud database 106 to obtain the data it requires, performs its computation on the result and the function code executing in the function computation system 104 returns the computed data as a response to web server 103.

A combinatorial URL 107 is used to address function computation system 104 and associated function source code 105. In FIG. 1, the leftmost hostname portion of the combinatorial URL 107 "c.n1m.com" identifies the function computation system 104 itself and the remaining part of the URL "github.com/a/func.py" identifies the function location and path 105 that function computation system 104 should execute.

If the source component in the combinatorial URL is a reference to a function package, the function package is loaded instead of a source file containing the source of a singular function. In the case a function package is a source, the function execution URL contains a query parameter giving the specific function name in the package that the computation engine should execute.

The computation engine should look the source URL up in its function mapping database and if the function is found to be mapped, the function it is mapped to should be swapped in before function loading and execution.

To execute the function, a web server 103 resolves the c.n1m.com hostname to one or more IP addresses, contacts one of the IP addresses and passes a request including the full function source path portion of the combinatorial URL to it. Combinatorial URL 107 also includes a parameter "variable_x=1" that is passed as part of the request made by web server 103 and that parameter is given as an input parameter to the function by function computation system 104 when system 104 executes the function.

If the computation engine determines the function is signed by the presence of a verify_id parameter, the engine will look for a signature in the header or footer of the function source it loads. The computation engine will validate the signature and associated identity match the identity name If the signature does not match, the function will not be executed and an error will be returned.

If the function query parameters contain a secret value variable set, the associated secret values are loaded from the secret value database (normally a key/value store) and passed to the function as input parameters when the function is executed.

Applications written for a handheld device such as a smart phone 102 can contact the function computation system 104 to obtain graphs to display or to obtain data to present visually to a user. An example application might be one written for Apple's iOS or Google's Android operating systems. An application running on smart phone 102 can contact other databases, such as database 106 directly, or other servers as part its operation. In the case the smart phone 102 requests a graph or data from function computation system 104, the system would compute a response in the same manner of handling a request from a web server 103.

The smart phone application 102 executes the function using function address 107 in the same manner as web server 103 executes the function above. Application 102 resolves the leftmost hostname in the combinatorial URL to determine a function computation system server that is a component of function computation system 104 to contact, then calls that server with a request that includes the full function source path portion 105 along with the parameter "variable_x=1" to pass to the function when initiating function execution.

A scheduled and eventing function invoker 108 can programmatically execute functions at a given time intervals, such as every 10 minutes or based on monitoring an external event such as a change in a web page, change in a stock price, etc. The scheduling portion of function invoker 108 maintains a schedule of times and their respective function execution requests and calls the function computation system 104 with the associated function execution request at the specified scheduled intervals. The eventing portion of the function invoker 108 maintains a schedule of external changes to monitor along with what functions to execute when specified monitored conditions are satisfied. Invoker 108 continuously monitors for triggering event conditions and invokes functions as they are triggered. The list of scheduling, events and their associated function requests may be stored in an SQL or key/value databases and function execution results may be logged to the same.

Figure 2:
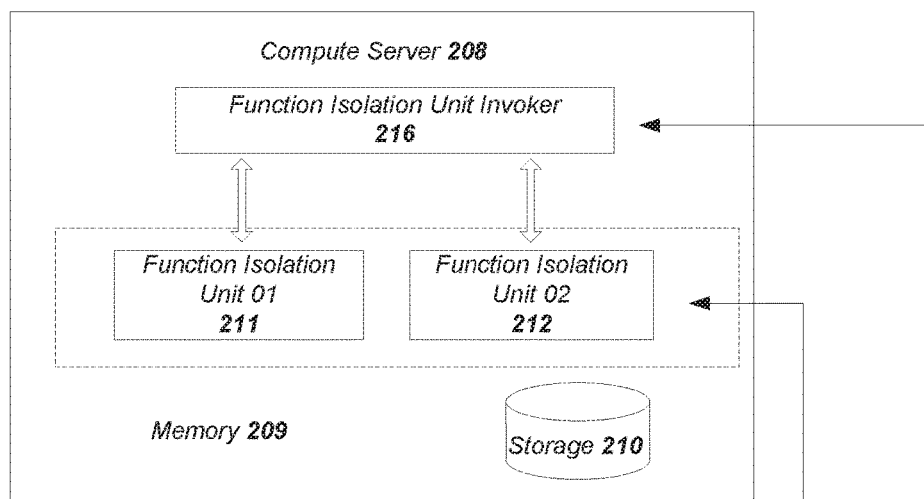
FIG. 2 illustrates a functional block diagram of the architecture of a serverless computation system, according to an embodiment of the invention.

FIG. 2 shows the preferred embodiment of the function computation system and associated processes in more detail as it relates to the execution of a function invoked by a single page application 201 running in a web browser. A representative single page application may be developed using the React framework, with the code executing in the web browser written in the JavaScript language. The application runs in Web Browser 201 and presents a web browser based user-interface to a user that the user can interact with. As part of this display, the user-interface JavaScript code may need to call a function to obtain data to display in some manner In FIG. 2, combinatorial URL 215 is one such representative function. To execute this function, JavaScript code that is part of single page application 201 will make a call to establish a connection that, in turn, resolves the leftmost hostname portion "c.n1m.com" of combinatorial URL 215 to find a computation server to call to execute the function.

Figure 4:
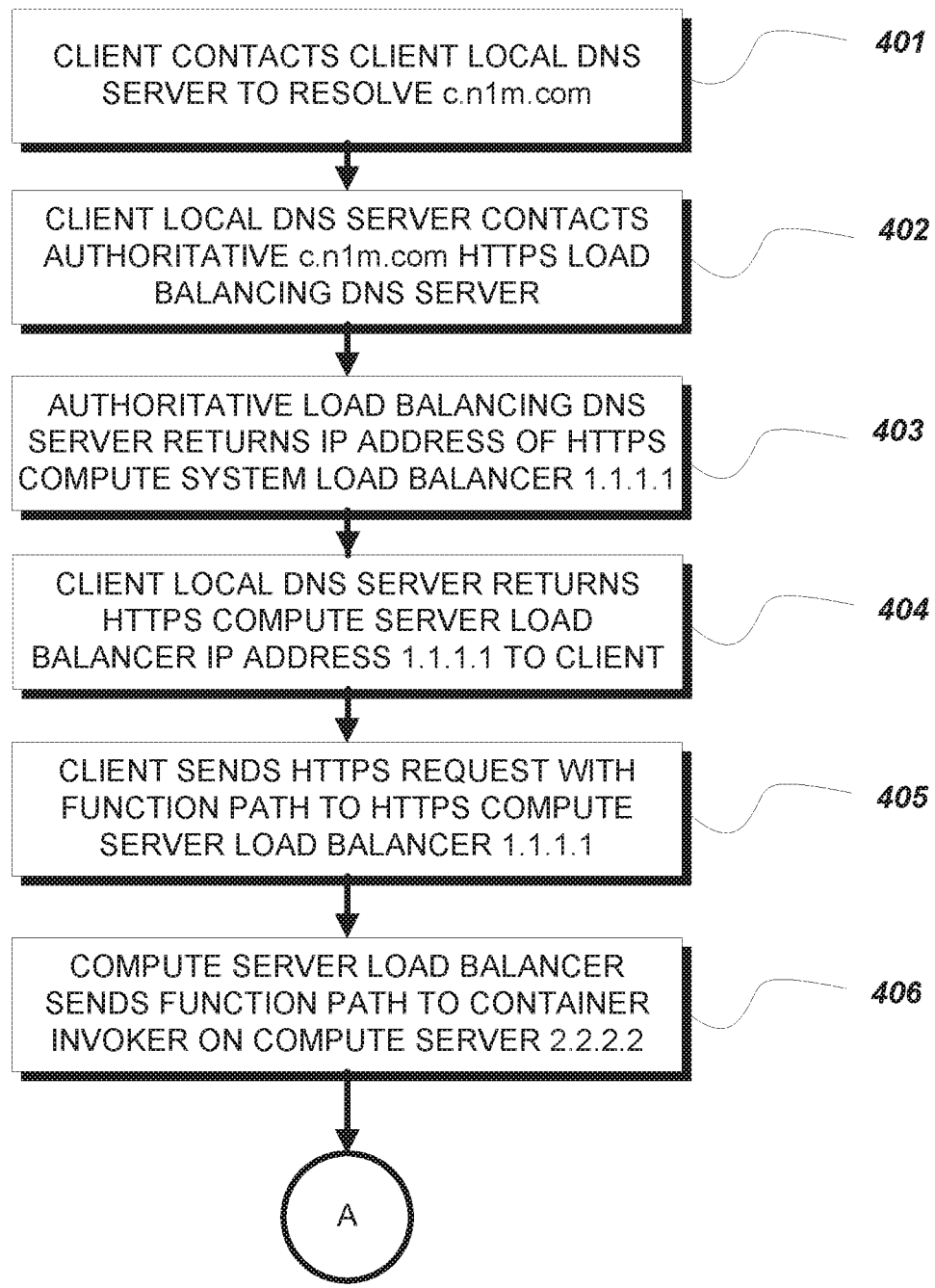
FIG. 4 illustrates a flowchart of an example process for function execution up until an invoker receives a function path, according to an embodiment of the invention.

FIG. 4 is a flowchart detailing the flow of operations from the JavaScript client until function invocation on a compute server. The process begins with a client, the JavaScript function code, contacting a client local DNS server, through the computer it is run on, to resolve the hostname "c.n1m.com".

To resolve the hostname, the web browser will make DNS request 202 to the client local DNS server 203 associated with the computer the application 201 is running on. Local DNS server 203, in turn, makes requests to the ".com" DNS servers in the Internet to determine the authoritative DNS server for "n1m.com". The authoritative set of servers is returned to client local DNS server 203 by the ".com" servers. Local DNS server 203 then makes a request to resolve "c.n1m.com" to DNS load balancer 204, a DNS server that is part of the compute server system and that has been assigned to be authoritative for the "n1m.com" domain in the ".com" server registry. This details the process shown in step 402 of FIG. 4.

The DNS load balancing server 204 system monitors the servers associated with the function computation system and will return a compute server IP address to the client local DNS server that can best execute the function associated with the hostname "c.n1m.com" depending on a variety of variables. Those variables can include proximity and/or latency to the requester (the computer running single page application 201) or latency close to the requester (client local DNS server 203) and/or function compute server availability and current resource utilization. This details the process shown in step 403 of FIG. 4.

The set of best compute server IP addresses is then returned by client local DNS server 203 as part of a DNS response 202 to the web browser single page application 201. This details the process shown in step 404 of FIG. 4. In step 404, the set of best compute server IP addresses is a single IP address, 1.1.1.1, which represents a compute server load balancer embodying a virtual compute server, After obtaining a one or more IP addresses for compute servers, application 201 will select one to connect with and establish a HTTPS connection with that server by IP address. The compute server associated with the IP address is virtual compute server in that it is a server that is routed through a HTTPS compute server load balancer 206. HTTPS load balancer 206 presents a virtual IP address and compute server to the Internet that maps to a number of local compute servers and IP addresses in a local cluster of servers. This mapping may be performed by utilizing an Nginx server as a load balancing server, using a Haproxy load balancing server setup, using a Linux Virtual Server load balancing setup or similar. This details the process shown in step 405 of FIG. 4.

Load balancing server 206 chooses a compute server 208 to fulfill the function execution request based on variables including the availability of the possible compute servers, their current resource utilization in terms of CPU, memory and network resources and their latency relating to resources that may be needed to execute the function given in the request.

After determining the best compute server 208 to contact, compute server load balancer 206 passes request 205 to the chosen compute server 208 by proxying the request 207. This details the process shown in step 406 of FIG. 4. In step 406, the set of best compute server IP addresses is a single IP address, 2.2.2.2.

Figure 5:
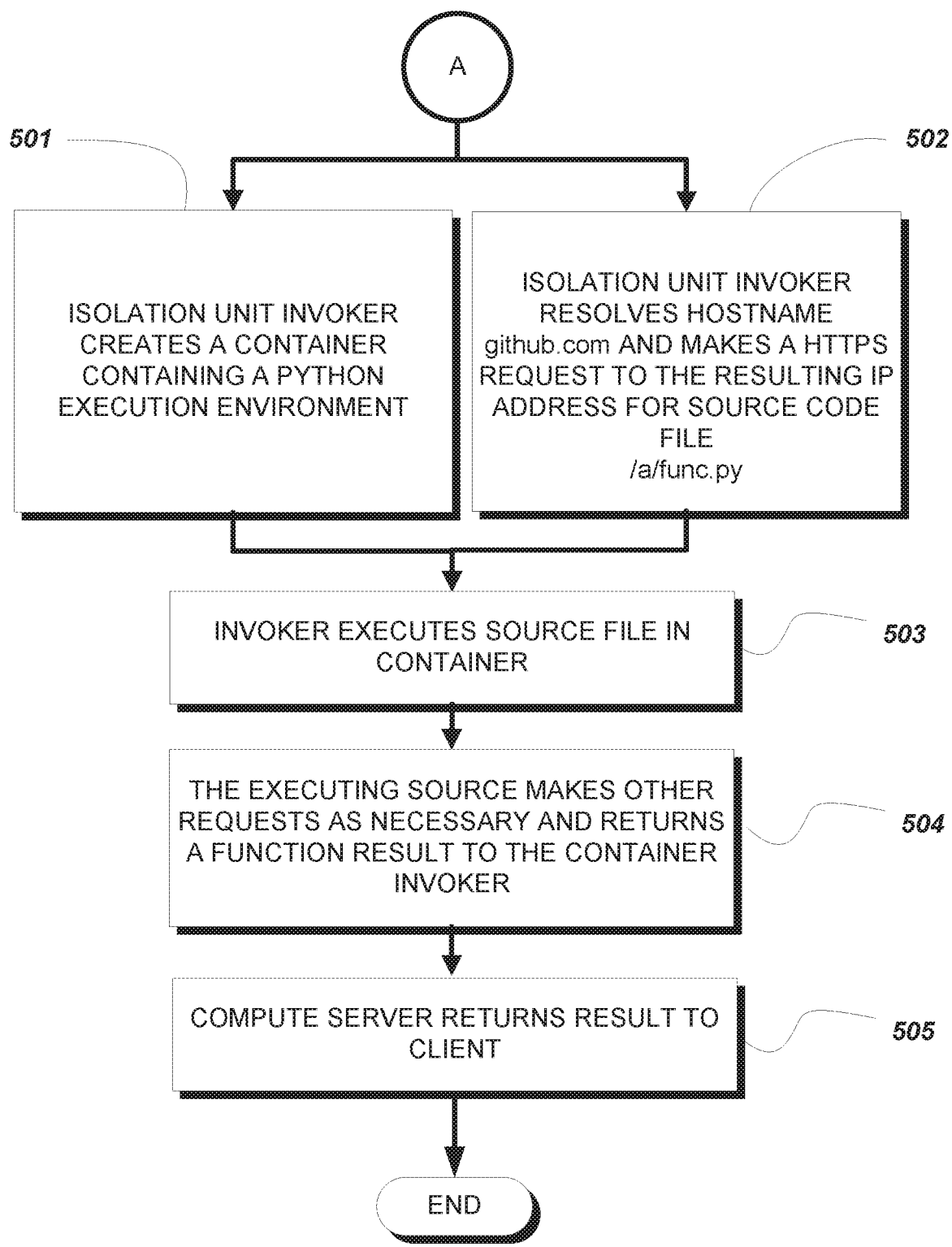
FIG. 5 illustrates a flowchart of an example process for function execution given a combinatorial path from when an invoker receives a function path, according to an embodiment of the invention.

FIG. 5 is a flowchart detailing the flow of operations following the steps in FIG. 4 from when an invoker 216 receives request 207. After receiving request 207, invoker 216 running in compute server 208 first looks for an existing function isolation unit that can be utilized to execute the given function. If a previously created isolation unit 211 is suitable, it can be utilized to execute the given function. In this case, isolation unit 211 is currently executing another function so a new isolation unit 212 is created by invoker 216. The isolation unit itself may be a Docker container, LXC (Linux Containers), Windows container, a unikernel based isolation unit, a micro VM, Hyper-V container or similar.

The unit isolation system prevents the function executing within it from accessing unauthorized memory 209 or unauthorized storage 210 regions of compute server 208. Compute server 208 may be a virtual or physical server. The invoker and isolation units may execute within an isolation unit themselves.

An execution environment is loaded or configured into an isolation unit 212 by invoker 216 prior to function execution. The specific execution environment may be determined by a parameter in the function request, by the leftmost hostname in a combinatorial URL, by a portion of the source code portion of a combinatorial URL or similar means. In the case the source code path represents a path to a container image, the container image itself can be loaded and defines the execution environment.

In the case the source code to execute in the request ends in a ".py", as in combinatorial URL 215, a Python execution environment may be loaded or configured by invoker 216 before execution. This details the process shown in step 501 of FIG. 5.

In parallel with determining a suitable isolation unit or creating/setting up an appropriate isolation unit, invoker 216 makes a request 213 for the source code associated with the combinatorial URL 215 that is part of function execution request 207.

The source code request itself may be a request for source from a source code control system such as Github, may be a a HTTPS request to source code that exists in a directory on a web server or similar. In combinatorial URL 215, the source code can be found on "github.com" in the path "a/func.py" and HTTPS request 213 is made by invoker 216 for the URL "github.com/a/func.py" to obtain the function source. This details the process shown in step 502 of FIG. 5.

The function source code returned may be cached in the system for a period of time after retrieval. To enable this, the function source request itself may go through a caching proxy such as Nginx, in which case if the same function source is requested in the future, the cached version can be returned from the Nginx caching server.

After obtaining the function source code and obtaining an isolation unit 212 with an appropriate environment, invoker loads the function source into the isolation unit and executes it. This details the process shown in step 503 of FIG. 5. As part of function invocation, if parameters are included as part of the function execution request, they are passed when invoking the function. Combinatorial URL 215 contains the parameter "variable_x=1" and in this case, invoker 216 will pass that to the function when invoking it to execute in isolation unit 212.

During function execution, the function executing in in the isolation unit (such as a container) 212 may access other data sources such as database 214 to obtain data that allows it to calculate an appropriate response. Alternative data sources the function may access include machine learning models, web pages, social media feeds, weather feeds, etc. This details the process shown in step 504 of FIG. 5.

When the function executing in isolation unit 212 has computed a response, it returns the response to invoker 216. Invoker 216, in turn, returns the response 207 to compute server load balancer 206. It, in turn, returns the response 205 to the single page application 201. This details the process shown in step 505, the final step in FIG. 5.

Figure 6:
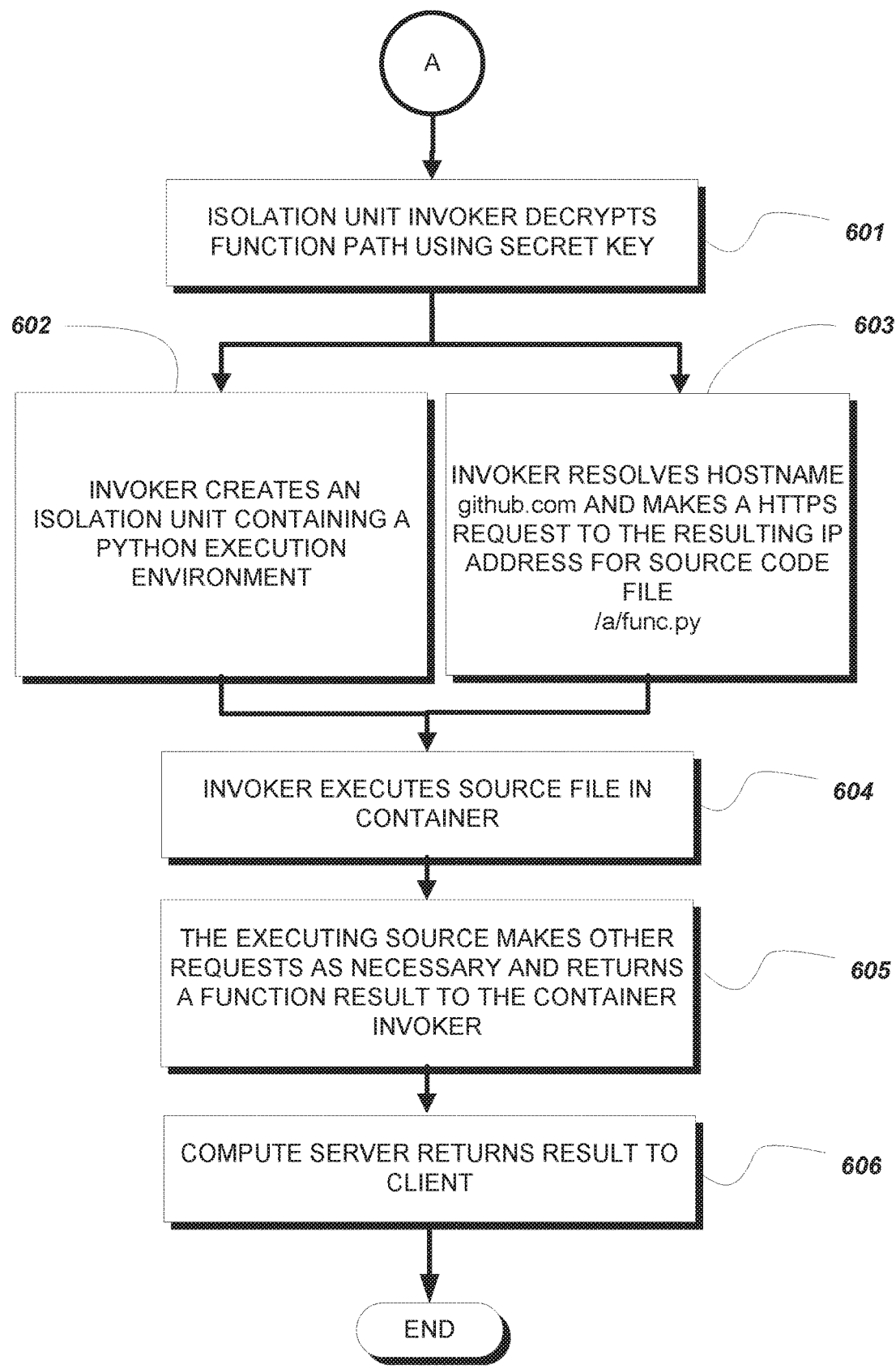
FIG. 6 illustrates a flowchart of an example process for function execution given a combinatorial path containing hidden functions from when an invoker receives a function path, according to an embodiment of the invention.

FIG. 6 shows the execution of a hidden function following the steps in FIG. 4. The main difference between the flow of operations in FIG. 5 and FIG. 6 is that the actual function path is decrypted with a private key as the first step. The private key may be a global private key maintained by the function compute system or may be a private key just associated with a partial portion of the combinatorial path associated with the function executed.

A representative hidden function in this example could be:
c.n1m.com/F9MD88CM001MC01
which is the path:
c.n1m.com/github.com/a/func.py
with the source code path symmetrically encrypted with the AES algorithm and a global private key maintained by the function computation system.

When the isolation unit invoker encounters the hidden encrypted URL, it will decrypt it 601 and then create or locate an appropriate container 602 to execute the given function. In parallel with isolation unit management such as container management 602, the invoker will resolve the source code hostname in the decrypted hidden URL and make a HTTPS request for the source code 603.

The invoker will then execute the source in the isolation unit such as container 604, the source will make other requests as necessary 605, and the result returned to the client originating the request 606.

FIG. 3 presents a variety of combinational URLs that can be processed by the computation engine. URL 301 contains a source host "raw.githubusercontent.com" along with a source path to an echo.js function. The computation engine will load the echo.js function from the githubusercontent source location and execute it, passing it "hello world" parameter as a "msg" variable.

URL 302 is a similar example in that it has a source location with a "raw.githubusercontent.com" hostname, but in this example a token is passed that enables access to a private githubusercontent.com account. The hello.js source function in the nimcorp-dev/demo path will be pulled from the private account using the given authorization token by the computation engine. This example also shows the protocol used to access source included in the source path. The "fn.http" portion of the source path dictates that the HTTP protocol should be used to obtain the function source.

URL 303 is an example of a pipeline that combines two functions. The computation engine will first execute the get_dow_price.js JavaScript function from the source a.b.com and then pipe the output from that function into the input of another function to_csv.js. The to_cvs.js function converts the output of the first function to a set of comma separated values. The computation engine returns the result of the composition of the two functions.

URL 304 is an example of a combinatorial URL with an inline function. The "p1" prefix in the hostname p1.n1m.com causes the system to route to a computation engine that can execute a function written in the Perl programming language. The source function is contained in the URL as an inline Perl function that converts the word "dog" to "cat". The input to the function is "cat" causing the computation engine to return "dog" as a result of function execution.

URL 305 is an example of a tamper-proof function. When the get_weather.js JavaScript function is retrieved by the computation engine, it will verify that hashing the function source matches the hash value that is part of the "hash" query parameter. If the hash value matches, the computation engine will execute the function normally. If it does not match, the computation engine will return an error.

URL 306 is an example where the source location is encrypted as a JSON web token. Before operating on the source location, the computation engine will decrypt the source location in the method of RFC 7519 which describes how to encrypt and decrypt web tokens to sign/encrypt JSON objects.

URL 307 is an example that will cause the computation engine to execute a api.weather.com function with the given parameters and then pipe the resulting function output as input to an internal inline function. The computation engine supports a number of internal functions that can process function output in simple ways. In URL 307, the first function output is passed to a subsequent int.col0 function. The int.col0 function is a simple function that takes a JSON formatted table of data as input and that extracts the first column of data to return as function output.

URL 308 is an example of an encrypted hidden function. The source location in the URL is encrypted with a symmetric private key. When the computation engine encounters an encrypted hidden function, it will decrypt the function with the private symmetric key it has stored as a first step, before processing the source portion of the combinatorial URL. When source locations are encrypted, they are encrypted into a set of URL-safe characters.

URL 309 is an example where the computation engine itself will contact another computation engine as a source location. The first computation engine contacted, js.n1m.com, contacts py.n1m.com as a source location. The py.n1m.com computation engine is passed a github.com source location with a path to a Python source code file func.py. The py.n1m.com computation engine will execute the func.py Python source code and the result will be returned as source for the js.n1m.com computation engine to execute. The func.py Python function should return JavaScript source code for the js.n1m.com computation engine to execute.

3.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 7:
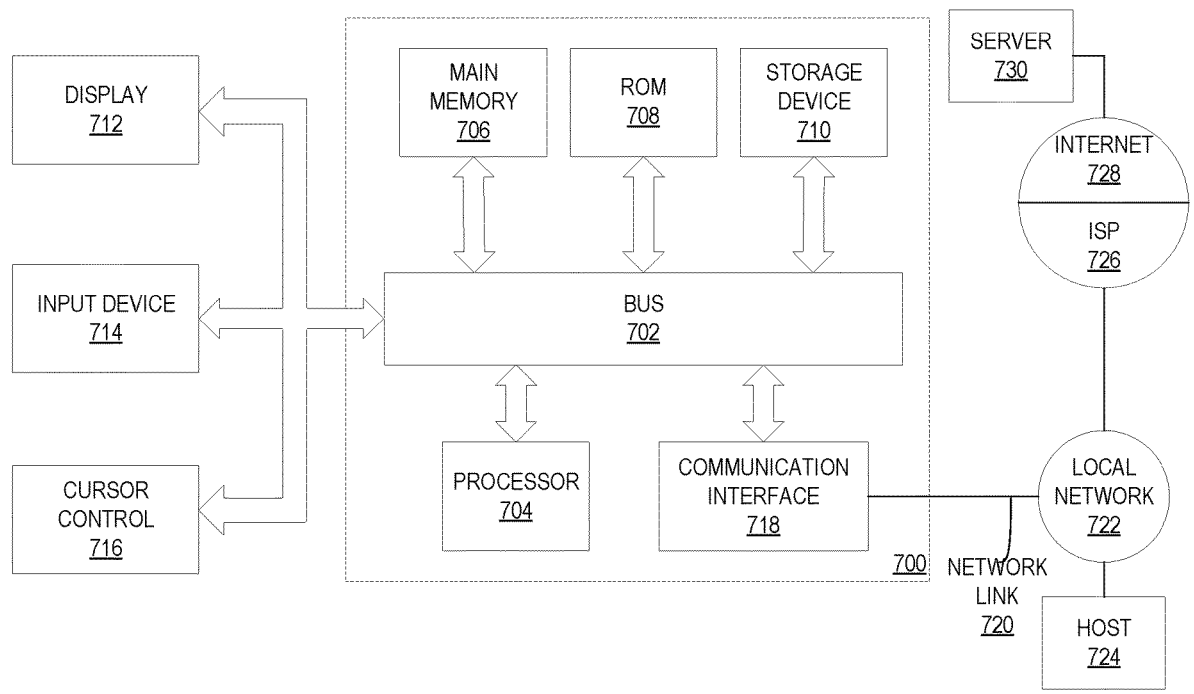
FIG. 7 is block diagram of a computer system upon which embodiments of the invention may be implemented.

FIG. 7 is a block diagram that illustrates a computer system 700 utilized in implementing the above-described techniques, according to an embodiment. Computer system 700 may be, for example, a desktop computing device, laptop computing device, tablet, smartphone, server appliance, computing mainframe, multimedia device, handheld device, networking apparatus, or any other suitable device.

Computer system 700 includes one or more busses 702 or other communication mechanism for communicating information, and one or more hardware processors 704 coupled with busses 702 for processing information. Hardware processors 704 may be, for example, a general purpose microprocessor. Busses 702 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel Computer system 700 also includes a main memory 706, such as a random access memory (RAM) or other dynamic or volatile storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes one or more read only memories (ROM) 708 or other static storage devices coupled to bus 702 for storing static information and instructions for processor 704. One or more storage devices 710, such as a solid-state drive (SSD), magnetic disk, optical disk, or other suitable non-volatile storage device, is provided and coupled to bus 702 for storing information and instructions.

Computer system 700 may be coupled via bus 702 to one or more displays 712 for presenting information to a computer user. For instance, computer system 700 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 712 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 712.

In an embodiment, output to display 712 may be accelerated by one or more graphics processing unit (GPUs) in computer system 700. A GPU may be, for example, a highly parallelized, multi-core floating point processing unit highly optimized to perform computing operations related to the display of graphics data, 3D data, and/or multimedia. In addition to computing image and/or video data directly for output to display 712, a GPU may also be used to render imagery or other video data off-screen, and read that data back into a program for off-screen image processing with very high performance Various other computing tasks may be off-loaded from the processor 704 to the GPU.

One or more input devices 714 are coupled to bus 702 for communicating information and command selections to processor 704. One example of an input device 714 is a keyboard, including alphanumeric and other keys. Another type of user input device 714 is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. Yet other examples of suitable input devices 714 include a touch-screen panel affixed to a display 712, cameras, microphones, accelerometers, motion detectors, and/or other sensors. In an embodiment, a network-based input device 714 may be utilized. In such an embodiment, user input and/or other information or commands may be relayed via routers and/or switches on a Local Area Network (LAN) or other suitable shared network, or via a peer-to-peer network, from the input device 714 to a network link 720 on the computer system 700.

A computer system 700 may implement techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 700 can receive the data on the network and demodulate the signal to decode the transmitted instructions. Appropriate circuitry can then place the data on bus 702. Bus 702 carries the data to main memory 706, from which processor 704 retrieves and executes the instructions. The instructions received by main memory 706 may optionally be stored on storage device 710 either before or after execution by processor 704.

A computer system 700 may also include, in an embodiment, one or more communication interfaces 718 coupled to bus 702. A communication interface 718 provides a data communication coupling, typically two-way, to a network link 720 that is connected to a local network 722. For example, a communication interface 718 may be an integrated services digital network (ISDN) card, cable modem, satellite modem, or a modem to provide a data communication connection to a corresponding type of telephone line. As another example, the one or more communication interfaces 718 may include a local area network (LAN) card to provide a data communication connection to a compatible LAN. As yet another example, the one or more communication interfaces 718 may include a wireless network interface controller, such as a 802.11-based controller, Bluetooth controller, Long Term Evolution (LTE) modem, and/or other types of wireless interfaces. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by a Service Provider 726. Service Provider 726, which may for example be an Internet Service Provider (ISP), in turn provides data communication services through a wide area network, such as the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

In an embodiment, computer system 700 can send messages and receive data, including program code and/or other types of instructions, through the network(s), network link 720, and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution. As another example, information received via a network link 720 may be interpreted and/or processed by a software component of the computer system 700, such as a web browser, application, or server, which in turn issues instructions based thereon to a processor 704, possibly via an operating system and/or other intermediate layers of software components.

In an embodiment, some or all of the systems described herein may be or comprise server computer systems, including one or more computer systems 700 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

4.0. Equivalents, Extensions, Alternatives and Miscellaneous

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving, by a load balancer, a request to execute a function from a client device, the request including a combinatorial universal resource locator (URL), the combinatorial URL including at least a function source code location and one or more isolation container computing resource locations that can execute a function source code;
   selecting, by the load balancer, one or more compute systems at the one or more isolation container computing resource locations specified in the combinatorial URL;
   sending, by the load balancer, the request to the one or more compute systems invoking the one or more compute systems to retrieve function source code from the function source code location specified in the request and execute the function source code in an isolation container;
   receiving, by the load balancer, a function result of the executed function source code from the one or more compute systems;
   returning the function result to the client device.

2. The method of claim 1, wherein the combinatorial URL includes one or more hostnames.

3. The method of claim 1, wherein the combinatorial URL includes one or more hostnames, and wherein the one or more hostnames include one or more load balanced Domain Name System (DNS) hostnames.

4. The method of claim 1, wherein the request includes one or more variable parameters.

5. The method of claim 1, wherein the source code for the function includes a digital signature.

6. The method of claim 1, wherein the source code for the function includes a digital signature, and wherein the one or more compute systems validates the digital signature before executing the source code for the function.

7. The method of claim 1, wherein the source code for the function includes a digital signature, wherein the one or more compute systems validates the digital signature before executing the source code for the function, and wherein the one or more compute systems do not execute the source code for the function when the digital signature is invalid.

8. The method of claim 1, wherein the function source code location is encrypted in the combinatorial URL in the form of a JavaScript Object Notation (JSON) web token.

9. The method of claim 1, wherein the isolation container is reused when it has been previously utilized to execute the same source code for the function.

10. The method of claim 1, wherein the function source code location refers to a GitHub source code location.

11. The method of claim 1, wherein the combinatorial URL is a hidden, encrypted URL.

12. The method of claim 1, wherein the combinatorial URL includes a hash code that is used to verify the data integrity of the source code for the function.

13. The method of claim 1, wherein a compute system of the one or more compute systems contacts another compute system as a function source code location.

14. The method of claim 1, wherein the function source code location is a combinatorial URL.

15. One or more non-transitory computer-readable storage media, storing one or more sequences of instructions, which when executed by one or more processors cause performance of:

receiving, by a load balancer, a request to execute a function from a client device, the request including a combinatorial universal resource locator (URL), the combinatorial URL including at least a function source code location and one or more isolation container computing resource locations that can execute a function source code;

selecting, by the load balancer, one or more compute systems at the one or more isolation container computing resource locations specified in the combinatorial URL;

sending, by the load balancer, the request to the one or more compute systems invoking the one or more compute systems to retrieve function source code from the function source code location specified in the request and execute the function source code in an isolation container;

receiving, by the load balancer, a function result of the executed function source code from the one or more compute systems;

returning the function result to the client device.

16. The one or more non-transitory computer-readable storage media of claim 15, wherein a compute system of the one or more compute systems contacts another compute system as a function source code location.

17. The one or more non-transitory computer-readable storage media of claim 15, wherein the combinatorial URL includes one or more hostnames, and wherein the one or more hostnames include one or more load balanced Domain Name System (DNS) hostnames.

18. A system, comprising:

a load balancer, implemented at least partially in hardware, configured to receive a request to execute a function from a client device, the request including a combinatorial universal resource locator (URL), the combinatorial URL including at least a function source code location and one or more isolation container computing resource locations that can execute a function source code;

wherein the load balancer is further configured to select one or more compute systems at the one or more isolation container computing resource locations specified in the combinatorial URL;

wherein the load balancer is further configured to send the request to the one or more compute systems invoking the one or more compute systems to retrieve function source code from the function source code location specified in the request and execute the function source code in an isolation container;

wherein the load balancer is further configured to receive a function result of the executed function source code from the one or more compute systems;

wherein the load balancer is further configured to return the function result to the client device.

19. The system of claim 18, wherein a compute system of the one or more compute systems contacts another compute system as a function source code location.

* * * * *